(No Model.)
J. W. SHAW.
DAMPER.
No. 299,172. Patented May 27, 1884.
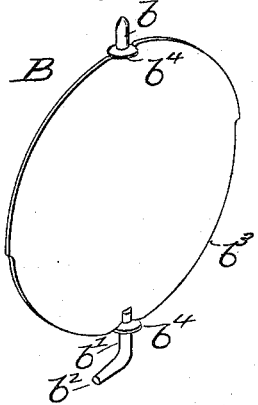
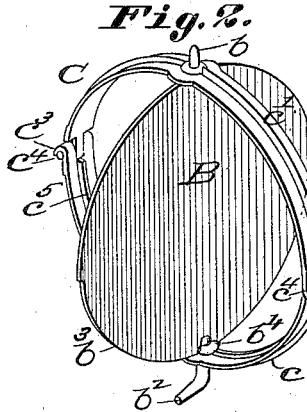
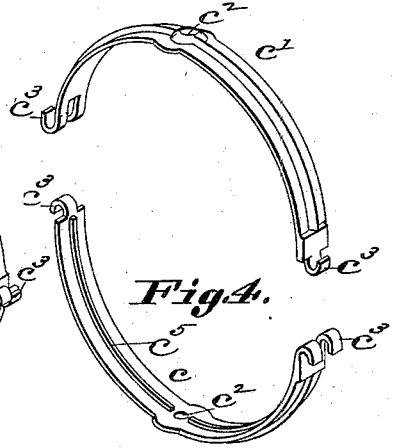
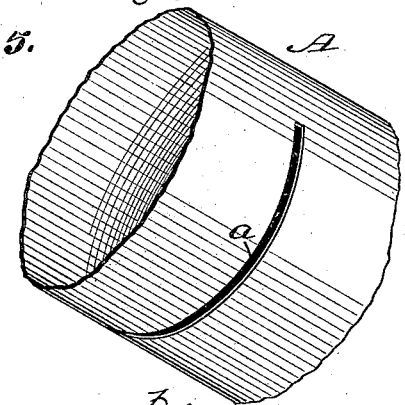
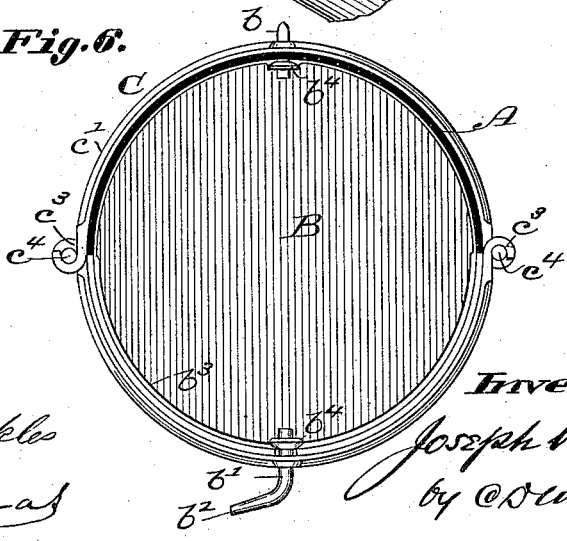
Attest:
Charles Pickles
J W Thomas
Inventor:
Joseph W. Shaw
by C D Moody
atty

United States Patent Office.

JOSEPH W. SHAW, OF ST. LOUIS, MISSOURI.

DAMPER.

SPECIFICATION forming part of Letters Patent No. 299,172, dated May 27, 1884.

Application filed November 12, 1883. (No model.)

*To all whom it may concern:*

Be it known that I, JOSEPH W. SHAW, of the city of St. Louis, State of Missouri, have made a new and useful Improvement in Dampers, of which the following is a full, clear, and exact description, reference being had to the annexed drawings, making part of this specification, in which—

Figure 1 is a view in perspective of the damper. Fig. 2 is a view in perspective showing the damper and the band which encircles the pipe; Fig. 3, a view in perspective of one part of the band; Fig. 4, a view of the other part of the band; Fig. 5, a view in perspective of the pipe in which the damper is inserted, and Fig. 6 a cross-section of the pipe with the damper in position.

The same letters of reference denote the same parts.

The aim of the present invention is to provide means by which a damper can be readily inserted in a pipe.

A represents the pipe in which the damper is to be inserted.

B represents the damper. It is in the form of a disk, and is provided with the journals $b\ b'$, the last-named journal being extended and suitably shaped to form the handle $b^2$.

The pipe A is slit at $a$, the slit extending sufficiently around the pipe to admit the damper, which is inserted through the slit $a$ into the pipe. Opposite the slit the pipe is perforated to receive one of the journals of the damper. This journal may be the one which is provided with the damper-handle. After the damper is thus inserted a band, C, is placed around the pipe opposite the slit $a$. This band is made in the two parts $c\ c'$, Figs. 2, 3, 4, 5. These parts are each perforated at $c^2$, to receive the damper-journals, which extend beyond the shell of the pipe and through the perforations $c^2\ c^2$, respectively. One of the parts, $c$, comes opposite the slit $a$, and the other, $c'$, of the parts is upon the opposite side of the pipe, and after the damper and the two parts of the band are placed in position, as shown in Fig. 6, the parts $c\ c'$ are fastened together, so as to form, in effect, a continuous band around the pipe, as follows: Each part of the band is provided with hooks $c^3\ c^3$, which, when the parts are put together, interlap, and are connected by means of the rods $c^4\ c^4$, as shown in Figs. 2, 6. One, $c$, of the parts on its inner side is provided with a rib, $c^5$, Figs. 2, 4, which, when the part is in place on the pipe, enters the slit $a$, serving both to close the slit and also to secure the band more effectually in its place on the pipe.

The damper is shaped out at $b^3$ to conform to the band-rib $c^5$, and the damper-journals are provided with the collars $b^4\ b^4$, which are the bearing-points of the damper when in place.

I claim—

1. The combination of a pipe, A, slit at $a$, a damper, B, and a band encircling the pipe opposite the slit, for the purpose described.

2. The combination of the pipe A, slit at $a$, the damper B, and a band having the rib $c^5$, substantially as described.

3. The combination of the pipe A, slit at $a$, the damper B, and the band C, made in the parts $c\ c'$.

4. The combination of the pipe A, slit at $a$, the damper B, and the band C, made in the parts $c\ c'$, and having the rib $c^5$, substantially as described.

JOSEPH W. SHAW.

Witnesses:
C. D. MOODY,
C. E. HUNT.